May 19, 1953
L. SPRARAGEN
2,638,642
SEALING STRIP
Filed Oct. 6, 1948
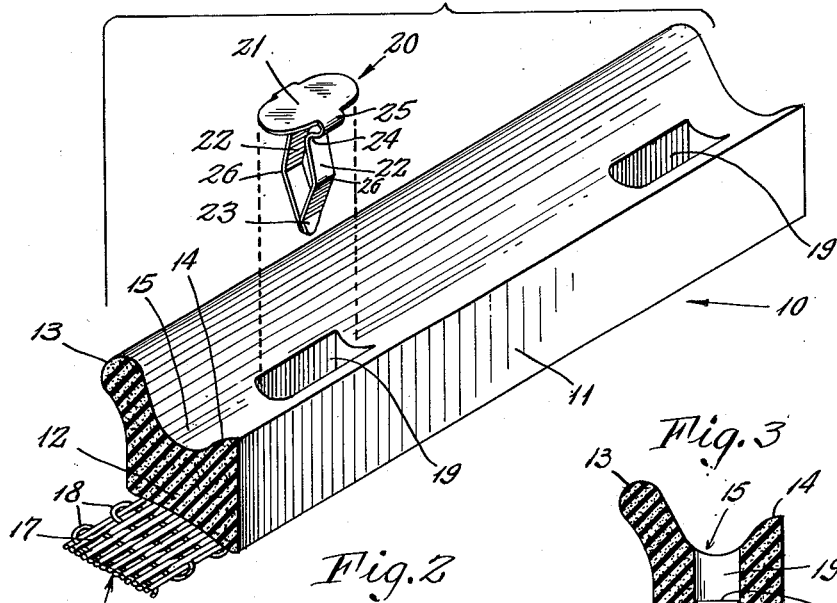
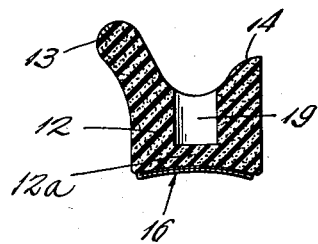
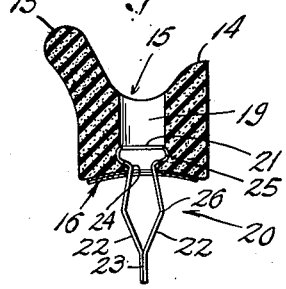
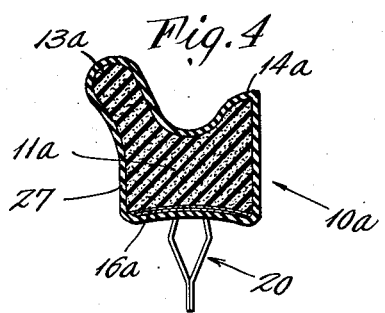
INVENTOR
Louis Spraragen
BY
Johnson and Kline
ATTORNEYS Patented May 19, 1953

2,638,642

UNITED STATES PATENT OFFICE 2,638,642

SEALING STRIP

Louis Spraragen, Bridgeport, Conn., assignor to Bridgeport Fabrics, Inc., Bridgeport, Conn., a corporation of Connecticut Application October 6, 1948, Serial No. 53,023

7 Claims. (Cl. 20—69)

This invention relates to detachable, compressible sealing strips such as are used to provide a seal between adjacent structural members.

An object of the invention is to provide an improved sealing strip and fastening means therefor, which has but few parts and is economical to make and assemble, and therefore produce, and yet provides a very effective seal when disposed between opposed structural members.

Another object of the invention is to provide an improved sealing strip characterized as above, which is removable and replaceable, and is extremely easy to apply and to remove.

A further object of the invention is to provide a sealing strip in accordance with the foregoing, which when mounted on its supporting structure is securely held in place at all times, and is moreover extremely durable and serviceable, having a long useful life.

In accomplishing the above objects there is provided by the invention a novel structure comprising an elongate strip-like body of compressible sealing material, preferably molded sponge rubber, having a flexible web-like base portion. When the body is molded of rubber, the base portion may be advantageously adhered to it in the molding process, by a rubber bond. Uniformly spaced along its length the strip body has a plurality of elongate recesses, located in a groove between longitudinal beads extending along opposite edges of the strip, the recesses having a depth less than the strip thickness, so that the base portion of the strip remains intact, together with the underlying web. Novel resilient sheet metal fasteners are provided, adapted to be secured in the strip after the molding thereof, by a simple operation whereby projecting stem parts of the fasteners are made to pierce the base portion of the strip and project therefrom as the fasteners are inserted into the recesses molded in the strip. The fasteners in no way interfere with the sealing operation and are accessible in the event it is desired to remove the strip.

In one embodiment of the invention the molded strip has a thin continuous skin of rubber on its body portion, and in another embodiment the body portion is provided with a solid rubber jacket of substantial thickness, to enable the strip to be more resistant to wear and abrasion.

In the preferred form of the invention the base portion of the strip is so formed that it provides a concave or slightly hollow undersurface, defined by the web part of the strip, and by this construction a more effective seal is provided since, when the strip is fastened to a supporting surface, the hollow or bowed face portion will be flattened and will provide a constant pressure against the supporting surface to effect a seal thereto.

Other features and advantages will hereinafter appear.

In the accompanying drawings:

Figure 1 is a perspective exploded view of a section of sealing strip made in accordance with the invention, one of the fasteners of the strip being shown separated therefrom, and the web or base portion of the strip being extended beyond the other portions to reveal its construction.

Fig. 2 is a transverse section taken through the strip of Fig. 1 at one of the recesses thereof, prior to application of the fastening means to the strip.

Fig. 3 is a view like Fig. 2 but showing the fastening means in place, and

Fig. 4 is a sectional view like Fig. 3 but illustrating a modification of the invention wherein a solid rubber jacket or outer covering is incorporated in the sealing strip.

Referring to Figs. 1 through 3, the improved sealing strip 10 shown therein comprises a resilient, compressible strip-like body 11, which is preferably of molded sponge rubber formed in strips of predetermined length or of indefinite length by a continuous process. The body 11 has a base portion 12, and formed integral therewith a full bead 13 and a half bead 14 separated by a groove 15, the said beads and groove extending longitudinally as shown.

In accordance with the invention the body 11 is molded to a base in the form of a web 16, by which it is attached to a support. The web is herein illustrated as being formed of interwoven longitudinal cotton strands 17, and transverse wire strands 18, the latter being formed as part of a single piece of wire zig-zag folded as indicated. The web 16 may have other constructions than that shown, and may be formed of other materials. For example, the longitudinal strands 17 of the web may be formed of twisted paper instead of cotton, and the transverse strands 18 formed of material other than metal wire. Preferably the web 16 is impregnated or coated with rubber or rubber cement subsequent to its being formed and prior to its being adhered to the strip body 11 in the molding process.

In accordance with the invention improved simplified means are provided whereby the sealing strip 10 may be quickly and securely removably attached to a supporting surface to provide a secure seal between the latter and a cooperable surface located opposite the supporting surface. This means includes a plurality of elongate open recesses 19 which are formed in the strip body 11 at the time it is molded, the recesses being located in the groove 15 and being longitudinally spaced apart and located at uniform intervals along the strip.

As shown in Figs. 2 and 3 the recesses 19 do not extend entirely through the base portion of the strip body 11, but instead extend into said base portion to a distance such that a substantial thickness of the body remains, overlying the web 16, as shown at 12a in Fig. 2.

The improved and simplified fastening means also comprises resilient sheet metal fasteners 20, Figs. 1 and 3, constructed in a novel manner whereby they may be readily inserted in the recesses 19 of the strip and made to pierce the portions 12a thereof and the webs 16 so as to extend from the under or inner side of the strip for insertion into socket parts of a supporting surface, thereby to support the strip on said surface. The fasteners 20 may be formed of any suitable metal but are preferably formed of carbon steel, being blanked from annealed strip stock and then formed into the shape shown, whereupon they are hardened and tempered. Each fastener 20 has a large oval-shaped flat head portion 21 from the opposite side edges of which stem parts 22 extend in opposed relationship, coextensive with each other. The stem parts 22 have pointed, slightly rounded extremities 23 which engage each other broadside, and have at their opposite or upper extremities pairs of reverse bends 24 and 25. Between the bends 24 and the extremities 23 the stem parts 22 have two straight portions disposed on opposite sides of a bend 26, arranged to provide a somewhat diamond-shaped configuration when the stem is viewed edgewise, as clearly shown in Figs. 1 and 3.

The extremities 23 of the fastener 20 are made sharp enough so that the fasteners may be inserted in the recesses 19 of the strip 10 and the stem parts 22 made to pierce the portions 12a of the strip and also the web 16, whereby the fasteners may be forced through the strip, projecting from the base portion thereof each to a position as shown in Fig. 3 wherein the flat head part 21 of each fastener engages and overlies the inner bottom surface of the recess 19. When the fastener is in this position the stem parts 22 project a substantial distance from the under or inner side of the strip 10, and are adapted to be received in a socket or recess of a supporting surface, to resiliently grip the socket and retain the sealing strip 10 in place on said surface.

An advantageous feature of the sealing strip 10 of the present invention is that the body portion 11 thereof may be molded and adhered to the web 16 by a continuous molding procedure without involving the use of inserts in the form of fasteners, such as have been required in previous types of sealing strips. Instead, the molding procedure of the present sealing strip involves the provision of the recesses 19, at uniformly spaced intervals along its length, which is a much more economical process than that of providing separate inserts in the form of fasteners. After the sealing strip 10 has been molded, the fasteners 20 may be quickly, easily and economically inserted in the recesses 19 and forced through the strip to the seated position shown in Fig. 3, whereupon the sealing strip is completed.

Preferably the body portion 11 of the strip and the web 16 are formed to present a concave or slightly bowed undersurface, as shown in Figs. 2 and 3. The curvature of this surface substantially disappears when the strip is secured to a supporting member, the underside or base portion of the strip becoming flattened and thereby maintaining a constant pressure against the supporting member so as to provide a more effective seal thereto.

By the above organization an extremely advantageous sealing strip is provided which is very economical to fabricate, provides an effective seal, is easily and quickly applicable to supporting surfaces and removable therefrom for replacement, and is securely maintained in place on the supporting surface at all times, providing a durable and serviceable sealing means.

A modification of the invention is shown in Fig. 4, wherein a sealing strip 10a is illustrated having a sponge rubber body 11a substantially similar in shape and characteristics to the body 11 shown in Figs. 1 through 3. The body 11a of Fig. 4 however is covered or jacketed by a substantial thickness or sheet of solid rubber 27 which envelops the entire strip, including the web 16a, the full bead 13a and the half bead 14a of the strip, and also the portions of the strip between the beads, which form the groove thereof. The operation by which the rubber jacket 27 is applied to the strip body 11a may be such that the walls of the recesses of the strip, which accommodate the fasteners 20, may also be lined by a thickness of solid rubber.

The construction shown in Fig. 4, wherein a solid rubber jacket is provided on the sealing strip, has the advantage that it is more resistant to abrasion and wear than constructions wherein there is no solid rubber jacket of substantial thickness.

The application of the fasteners 20 to the strip 10a is similar to that outlined above in connection with the strip 10.

The improved sealing strips 10 and 10a of the present invention have utility in connection with the sealing of doors and other closures, trunks where the lids are to be sealed to the body, and all other applications wherein a resilient, compressible sealing strip may be indicated.

Variations and modifications may be made within the scope of this invention and portions of the improvements may be used without others.

I claim:

1. A device for sealing opposed elongate surfaces to each other, comprising a compressible strip of resilient sealing material; a flexible web substantially coextensive with said strip, adhered to one side thereof, said web and strip having exposed elongate sides opposite each other for engagement with the said opposed surfaces, and said strip having a plurality of open recesses spaced apart longitudinally of the strip in the exposed side thereof; and resilient metal fasteners positioned in said recesses and passing through first the strip and then the web and projecting therefrom to fasten the web and strip to a support, said fasteners having exposed heads located in the recesses of the strip and engaging the strip in the bottoms of said recesses, said heads preventing the fasteners from being pulled out of the strip except through the said recesses.

2. A device for sealing opposed elongate surfaces to each other, comprising a compressible strip of resilient sealing material; a flexible web substantially coextensive with said strip, adhered to one side thereof, said web and strip having exposed elongate sides opposite each other for engagement with the said opposed surfaces, and said strip having a plurality of open recesses extending part way through said strip and spaced apart longitudinally of the strip in the exposed side thereof; and fastening means in the recesses passing through the portion of said strip in the bottom of said recess and web, and projecting therefrom to fasten the strip and web to a support, said means having exposed flat projecting parts engaging the remaining portions of the recess bottoms to seal the opening formed by the fastening means and prevent the fastening means from being pulled out of the strip except through said recesses.

3. A device for sealing opposed elongate surfaces to each other comprising a strip of sponge rubber; a flexible woven web substantially coextensive with said strip, molded to one side thereof, said web and strip having exposed elongate sides opposite each other for engagement with the said opposed surfaces, and said strip having a plurality of open recesses spaced apart longitudinally of the strip in the exposed side thereof; and fastening means passing through portions of the bottoms of the recesses and through the said strip and web, and projecting therefrom to fasten the strip and web to a support, said means having exposed flat, oppositely extended projecting parts engaging the remaining portions of the strip in the recess bottoms to seal the opening formed by the fastening means and prevent the fastening means from being pulled out of the strip except through said recesses.

4. A device for sealing opposed elongate surfaces to each other, comprising a strip of sponge rubber; a flexible web substantially coextensive with said strip, in broadside engagement therewith, said web and strip having outer elongate sides opposite each other, and said strip having a plurality of recesses spaced apart longitudinally of the strip in the outer side thereof; a jacket of solid rubber encompassing said strip and web, and covering the walls of said recesses; and fastening means passing through portions of the bottoms of the recesses and through the said strip, web and jacket, and projecting therefrom to fasten the same to a support, said means having exposed flat projecting parts engaging the remaining portions of the strip in the recess bottoms to prevent the fastening means from being pulled out of the strip except through said recesses.

5. A device for sealing opposed elongate surfaces to each other, comprising a compressible strip of resilient sealing material; a flexible web substantially coextensive with said strip, in broadside engagement therewith, said web and strip having outer elongate sides opposite each other, and said strip having a plurality of recesses spaced apart longitudinally of the strip in the outer side thereof; a jacket of solid, flexible rubber encompassing said strip and web, and covering the walls of said recesses; and fastening means passing through portions of the bottoms of the recesses and through the said strip, web and jacket, and projecting therefrom to fasten the same to a support, said means having exposed flat projecting parts engaging the remaining portions of the strip in the recess bottoms to prevent the fastening means from being pulled out of the strip except through said recesses.

6. A device for sealing opposed elongate surfaces to each other, comprising a compressible strip of resilient sealing material; a flexible web substantially coextensive with said strip, adhered to one side thereof, said web and strip having exposed elongate sides opposite each other for engagement with the said opposed surfaces, the exposed side of the web being concave transversely thereof and said strip having a plurality of open recesses spaced apart longitudinally of the strip in the exposed side thereof; and fastening means passing through portions of the bottoms of the recesses and through said web and strip and projecting therefrom to fasten the web and strip to a support whereby the concave side of the web becomes flattened under pressure, said fastening means having exposed flat projecting parts engaging the remaining portions of the strip in the recess bottoms to seal the opening formed by the fastening means and prevent the fastening means from being pulled out of the strip except through the said recesses.

7. A device for sealing opposed elongate surfaces to each other, comprising a compressible strip of resilient sealing material; a flexible web substantially coextensive with said strip, adhered to one side thereof, said web and strip having exposed elongate sides opposite each other for engagement with the said opposed surface and said strip having a plurality of open, elongate recesses spaced apart longitudinally of the strip in the exposed side thereof, and extending longitudinally of the strip; and fastening means passing through central portions of the bottoms of the recesses and through said web and projecting therefrom to fasten the web and strip to a support, said means having oppositely extending exposed flat projecting parts located in the recesses of the strip and engaging the remaining portions of the bottoms of said recesses to seal the opening formed by the fastening means, said parts preventing the fastening means from being pulled out of the strip except through the said recesses.

LOUIS SPRARAGEN.

References Cited in the file of this patent

UNITED STATES PATENTS

| Number | Name | Date |
|---|---|---|
| 1,799,904 | Howlett et al. | Apr. 7, 1931 |
| 2,116,846 | Pilcher | May 10, 1938 |
| 2,161,648 | Widman | June 6, 1939 |
| 2,193,719 | Foote | Mar. 12, 1940 |
| 2,215,515 | Matheny | Sept. 24, 1940 |
| 2,227,581 | Henderson | Jan. 7, 1941 |
| 2,239,269 | Lundvall | Apr. 22, 1941 |

FOREIGN PATENTS

| Number | Country | Date |
|---|---|---|
| 102,938 | Australia | 1938 |